(12) United States Patent
Knibbe et al.

(10) Patent No.: US 9,386,664 B2
(45) Date of Patent: Jul. 5, 2016

(54) METHODS OF CONTROLLING AN OUTDOOR LIGHTING SYSTEM

(75) Inventors: Engel Johannes Knibbe, Heeze (NL); Noël François Leopold Bonné, Zonhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 522 days.

(21) Appl. No.: 13/635,987

(22) PCT Filed: Mar. 21, 2011

(86) PCT No.: PCT/IB2011/051166
§ 371 (c)(1),
(2), (4) Date: Sep. 19, 2012

(87) PCT Pub. No.: WO2011/117799
PCT Pub. Date: Sep. 29, 2011

(65) Prior Publication Data
US 2013/0009569 A1    Jan. 10, 2013

(30) Foreign Application Priority Data

Mar. 25, 2010    (EP) .................................... 10157696

(51) Int. Cl.
*H05B 37/02*    (2006.01)
(52) U.S. Cl.
CPC ........ *H05B 37/0227* (2013.01); *H05B 37/0272* (2013.01); *Y02B 20/72* (2013.01)
(58) Field of Classification Search
None
See application file for complete search history.

(56) References Cited

U.S. PATENT DOCUMENTS 8,805,550 B2 *    8/2014    Chemel et al. .................. 700/22
8,841,859 B2 *    9/2014    Chemel et al. ................ 315/294
(Continued)

FOREIGN PATENT DOCUMENTS

EP    2369899 A1    9/2011
GB    2444734 A    6/2008
(Continued)

OTHER PUBLICATIONS

Intelligent Road and Street Lighting in Europe, www.e-streetlight.com.
(Continued)

*Primary Examiner* — Lincoln Donovan
*Assistant Examiner* — Khareem E Almo
(74) *Attorney, Agent, or Firm* — Meenakshy Chakravorty (57) ABSTRACT

A method (100) of controlling an outdoor lighting system, a computer program product, a controlling device for controlling an outdoor lighting system and an outdoor lighting system are provided. The outdoor lighting system comprises outdoor lamps which are distributed over spatial segments of an outdoor space. The emitted light intensity of the outdoor lamps is controllable per spatial segment, and references are used to refer to specific spatial segments. The method (100) comprises the steps of (i) receiving (102) from a detection system an indication of a sub-area of the outdoor space and receiving at least one activity property or the sub-area, the detection system being arranged for detecting activity in the sub-area, the sub-area being different from all the spatial segments, and the indication being used to refer to the sub-area, and the at least one activity property being related to a traffic density in the sub-area (ii) mapping (104) the at least one indication to at least one reference of a respective spatial segment, (iii) determining (106) a light intensity level for the respective at least one spatial segment in dependence on the received at least one activity property, (iv) providing (108) the at least one reference together with the respective determined light intensity to the outdoor lighting system.

19 Claims, 4 Drawing Sheets

(56) References Cited

U.S. PATENT DOCUMENTS

| | | | |
|---|---|---|---|
| 8,866,408 B2* | 10/2014 | Chemel et al. | 315/297 |
| 8,938,431 B2* | 1/2015 | Densham et al. | 707/687 |
| 2007/0085701 A1 | 4/2007 | Walters et al. | |
| 2009/0034258 A1 | 2/2009 | Tsai et al. | |
| 2009/0267540 A1 | 10/2009 | Chemel et al. | |
| 2013/0009569 A1 | 1/2013 | Knibbe et al. | |

FOREIGN PATENT DOCUMENTS

| | | |
|---|---|---|
| JP | 2002305088 A | 10/2002 |
| WO | 03098977 A1 | 11/2003 |
| WO | 2007008283 A2 | 1/2007 |
| WO | 2008033029 A1 | 3/2008 |
| WO | 2008059412 A1 | 5/2008 |
| WO | 2009003279 A1 | 1/2009 |
| WO | 2011083374 A1 | 7/2011 |
| WO | 2011117799 A1 | 9/2011 |

OTHER PUBLICATIONS

Sustainable Public Lighting Toolbox, ICLEI Oceania: On/Off Controls, http://iclei.org/index.php?id=6627.

* cited by examiner

| cell | segments |
|------|----------|
| I | a, b, c, t, u, v |
| II | c, d, e, v, w, x, y |
| III | e, f, g, y, z |

| cell | Moving direction | segments |
|------|------------------|----------|
| I | ≈ north | t, u, v |
| I | ≈ south | a, b, c |
| II | ≈ north | v, w, x, y |
| II | ≈ south | c, d, e |
| III | ≈ north | y, z |
| III | ≈ south | f, g |

FIG. 4b

METHODS OF CONTROLLING AN OUTDOOR LIGHTING SYSTEM

FIELD OF THE INVENTION

The invention relates to methods and systems for controlling an outdoor lighting system.

BACKGROUND OF THE INVENTION

Many state of the art street lighting systems have the capability of dimming the light of the street lamps such that energy may be saved. The street lamps are, for example, dimmed to a lower light intensity between 11:00 pm and 5:00 am. The reduction of the emitted light intensity during these hours is possible because of the relatively low average traffic intensity during these hours. Street lighting systems are often subdivided into segments of streets lamps with a fixed length of, for example, 2 km. At intersections the segments have often different lengths. The desired light intensity emitted by the street lamps of each one of the segments may be controlled from a central location.

Published UK patent application G2444734A discloses an energy-efficient road lighting employing presence detection. The road lighting system has a dedicated activity detection system in which every lamp standard has a detection means for detecting vehicles in the immediate vicinity of the lamp standard. When a vehicle is detected, the direction of movement and the speed of movement are assessed. This information is communicated to neighboring lamp standards, for example, the lamp standards situated ahead. On the basis of the received information a controller of each one of the lamp standards decides whether the lamp has to emit light, or has to be switched off. Lamps situated ahead in the direction in which a vehicle is moving are switched on before the vehicle passes the lamp standard, and lamps passed by the vehicle are switched off.

A problem of the disclosed road lighting system is that each one of the lamp standards has to include a lot of hardware, like a detection means, a controller, and communication means. Thus, the system according to the UK patent is relatively expensive.

SUMMARY OF THE INVENTION

It is an object of the invention to provide a solution enabling controlling the light intensity of street lighting in a more economical manner.

A first aspect of the invention provides a method of controlling an outdoor lighting system in dependence on information received from a detection system as claimed in claim 1. A second aspect of the invention provides a computer program product according to claim 13. A third aspect of the invention provides a controlling device for controlling an outdoor lighting system in dependence on information received from a detection system as claimed in claim 14. A fourth aspect of the invention provides an outdoor lighting system according to claim 15. Advantageous embodiments are defined in the dependent claims.

The first aspect of the invention provides a method of controlling an outdoor lighting system. The outdoor lighting system comprises outdoor lamps which are distributed over spatial segments of an outdoor space. The emitted light intensity of the outdoor lamps is controllable per spatial segment, and references are used to refer to specific spatial segments. The method comprises a step of receiving from a detection system an indication of a sub-area of the outdoor space and receiving at least one activity property for the sub-area. The detection system is arranged to detect activity in the sub-area. The sub-area is different from all the spatial segments. Indications are used to refer to the sub-area. The at least one activity property relates to a traffic density in the sub-area. In another step the method maps the at least one indication to at least one reference of a respective spatial segment. The method comprises a further step of determining a light intensity level for the respective at least one spatial segment in dependence on the received at least one activity property. A final step comprises the provision of the at least one reference together with the respective determined light intensity to the outdoor lighting system.

There is a large installed base of detection systems close to roads, highways, parking lofts or petrol stations which each detect a specific activity happening in the outdoor space. And in some countries there is an installed base of outdoor lighting system enabling the light intensity of the segments to be controlled. However, the information of the detection systems is not yet used for controlling the outdoor lighting systems. It is an insight of the inventors to couple the systems such that the outdoor lighting system is controlled using information that is already available in existing detection systems. However, the sub-areas of the detection system are different from the spatial segments of the outdoor lighting system and the activity information that is provided by the detection system is not immediately suitable for controlling an outdoor lighting system. It is a further insight of the inventors that a method of controlling the outdoor system has to be realized which transforms information from the field of outdoor detection systems into information suitable for outdoor lighting systems. Thus, the method allows the use of existing detection systems for controlling the outdoor lighting system without requiring the installation of new detection hardware in the outdoor space, and therefore the costs of controlling the outdoor lighting system are reduced.

The sub-areas are different from the spatial segments. This means that a part of the sub-areas do not directly map on the segments. Thus, they individually cover another part of the outdoor space than the individual segments. The segments of the outdoor lighting system may be much smaller than the sub-areas of the detection system, or there are a fewer sub-areas compared to the number of segments in the outdoor lighting system, or some sub-areas do not completely overlap with segments, or some segments do not completely overlap with the sub-areas. The method provides a mapping step to maps the sub-areas to segments which differ from the sub-areas. Advantageously it is not necessary to install detection sensors for every segment or for every outdoor lamp.

The outdoor space has to be interpreted as a predefined part of the complete outside space, for example, the streets of a village, a factory terrain, or a highway network. The union of all sub-areas and/or the union of all segments may fully or partially cover the outdoor space. However, because of the sub-areas being different from the spatial segments, the detection system may have a different coverage of the outdoor space than the outdoor lighting system.

An activity property of a sub-area is information that directly relates to activities that are happening within a sub-area. The property may be, for example, the value representing the number of moving vehicles, or the property may be, for example, a boolean value which indicates the presence or the absence of activity in the sub-area. In an embodiment, the activity property relates to traffic. It is to be noted that it may directly relate to moving vehicles or moving persons, and that it may indirectly relate to moving vehicles or moving persons because the detected activity is the activity of, for example, an electronic device which may be carried by a moving vehicle or moving person.

Further, it is to be noted that the primary function of the detection system is not the detection of activities of persons, vehicles or other entities. In the context of the invention it is only important that the detection system is capable of providing activity information relating to sub-areas. The activity information may be deducted from the information that is gathered by the detection system to perform its primary function. For example, a primary function of a toll collecting system is billing the toll fee. However, in order to perform this primary function, the toll collecting system detects the passage of vehicles with respect to a section of a road.

In an embodiment, the detection system is being arranged to detect activities in a plurality of sub-areas comprising the sub-area.

In an embodiment, the detection system is at least one of the following types: systems for detection of electronic devices, sound detection systems, observing systems or traffic detection systems.

The different types of detection system may be classified in different categories. A first category is a group of detection systems for electronic devices which are capable of detecting activity properties that relate to electronic devices. For example, a system may detect passing RFID chips or may detect wireless communication devices. A second category is a group of sound detection systems which detect activity in sub-areas on the basis of recorded audio signals. For example, a detection system to detect the noise levels in the neighborhood of a highway is capable of providing information which relates to estimated traffic density on the highway. A third category is a group of observing systems which detects or records electromagnetic waves in a sub-area, for example with a video camera. An activity property may be obtained by processing the recorded (video) information. For example, automatic toll collecting systems record images of license plates and are thus capable of providing a number representing the total number of detected cars within a specific time interval at a specific section of the highway. It is to be noted that infrared sensors are comprised in this category. A fourth category is a group of traffic detection systems of which the sensors are often arranged in the road itself. These systems detect the direct influence of passing vehicles and passing persons on characteristics of the environment. The pressure applied to the road by passing vehicles may be detected with a pressure sensor. An inductive or electromagnetic field may change as a result of a passing vehicle or person, which may be detected with a coil or one or more electrodes. And if a person or a vehicle passes, the local temperature may increase.

Once again it is to be noted that the primary function of the discussed system in this embodiment may be different from the discussed detection capability.

In an embodiment, the detection system is a mobile communication network. In a further embodiment, the received at least one activity property relates to at least one mobile communication device.

Mobile communication networks continuously register the presence of mobile communication devices within relatively well-defined areas, the so-termed cells. The mobile communication devices may be mobile phones or mobile data communication devices, or a combination thereof. The cells are areas, often circular, around base stations. Mobile communication networks are capable of detecting movements of the communication devices within a single cell or movements between two neighboring cells. This information relates most probably to movement of a person or vehicle. Thus, the mobile communication network is capable of providing activity properties for sub-areas of the outdoor space. Further, the mobile communication networks are capable of obtaining a rough estimate of a position of a mobile communication device, and thus relatively accurate indications of positions, speeds of movement and/or directions of movement of the individual mobile communication devices may be received by using the method according to the first aspect of the invention. Thus, based on the information from the mobile communication network the mapping of a cell or a plurality of cells to at least one spatial segment may be performed relatively accurately and/or the light intensity of the at least one segment may be determined relatively accurately.

Another advantage of the use of a mobile phone network is the relatively large areal coverage of such networks. In densely populated countries the mobile phone networks have an almost 100% coverage of the country and therefore the activity of mobile communication devices everywhere in the country may be detected by the mobile communication network. In less densely populated countries the mobile phone network at least covers the densely populated areas of the country.

If the outdoor lighting system is, for example, the street lighting system of a highway network, a large number of cells overlap with the highways. Mobile devices detected in a specific cell that overlaps with a specific highway and having a direction of movement which is roughly the same as the direction of the specific highway are most probably related to vehicles moving along the highway. Thus, the information related to the vehicles moving along the highway may be used to control the light intensity emission of the street lamps along the highway. For example, if a substantially large amount of mobile devices are moving in a cell which overlaps with, for example, highway A2, and if they are moving northwards, the street lamps along the northwards lane are controlled to emit more light.

The installed base of highway street lamps in, for example, the Netherlands is subdivided into segments having an almost equal length and often the street lamps along the lanes in one direction are assigned to other segments than the street lamps along the lanes in the opposite direction. Especially outside the cities the diameters of the cells of the mobile phone network are larger than the lengths of the segments. Thus, a translation has to be performed to map an indication of a specific cell, or indications of positions of individual mobile devices, to one or more segments of the streets lamps. If it is known that a mobile device is moving in a specific direction, the segments of the street lamps along the lanes in the specific direction may be selected. In another example, if the street lamps of segments of a highway near a soccer stadium are dimmed to a relatively low light emission level, and it has been detected in the mobile communication network that a lot of mobile devices detected inside a soccer stadium are moving towards the parking lot, the method of the invention may use a predictive controlling algorithm to pro-actively increase the light emission of the segments close to the highway exit of the soccer stadium, because it is expected that the traffic intensity increases within a short time period.

Thus, using information from a mobile communication network to control an outdoor lighting system provides a lot of possibilities to control the light emission such that the outdoor space is illuminated in a more traffic-friendly manner, while simultaneously saving electrical energy. Thus, it is not necessary to install a large amount of sensors for detecting vehicles, persons or other entities, thereby saving costs.

In an embodiment, the at least one activity property relates to a plurality of moving mobile communication devices.

In a further embodiment, the at least one activity property further comprises information about a direction of movement of the at least one communication device.

In another embodiment, the cells of the mobile communication network are the sub-areas.

In yet another embodiment, the mapping of the at least one indication to at least one reference is performed on the basis of a predefined mapping between the sub-areas and the spatial segments.

The subdivision of the outdoor space into sub-areas by the detection system and the subdivision of the outdoor lighting system into segments are both expected to be stable. If the value of an activity property itself is not important for the mapping of the at least one indication to references of segments, a predefined mapping is sufficient. The predefined mapping may, for example, be defined in the format of a function or a matrix. The use of such a mapping is an efficient and effective solution for relating the indication to segments.

In an embodiment, the predefined mapping is based on areal overlap between the sub-areas and the spatial segments. In other words, if a specific sub-area overlaps with a specific segment, the predefined mapping maps the indication of the specific sub-area to the reference of the specific segment. It is to be noted that the specific sub-area may have an overlap with more than one segment and thus the indication of the specific sub-area may be mapped to more than one reference.

In another embodiment, the mapping of the at least one indication to at least one reference further depends on the at least one activity property. The mapping of the at least one indication to a least one reference does not necessarily only depends on the indication of the sub-area. By taking into account other information, like the activity property, a more advanced control of the outdoor lighting system may be obtained.

In an embodiment, the at least one activity property comprises a direction of movement of an entity, and the mapping of the at least one indication to at least one reference is based on a prediction of a future activity by taking into account the direction of movement.

A prediction may be made of a future position of the entity whose direction of movement is known and thus a future activity may be estimated. By estimating the future position the method estimates in which segments the entity is going to be and thus the references of these segments may be selected in the mapping step which comprises the predictive algorithm. This is a more advanced algorithm resulting in better user-experiences because the light intensity levels of segments are already adapted to a desired level before the entity arrives in the segment.

The entity may be a detected person, a detected vehicle, or a detected group of vehicles, or for example a detected moving mobile phone.

In a further embodiment, the at least one activity property further comprises a corresponding speed of movement of the entity, and the prediction of the future activity is also based on the speed of movement.

An even more accurate prediction of the future activity may be made and as such the mapping of the at least one indication to a least one reference is thus performed in a more advanced way and probably results in more accurate results.

In an embodiment, the mapping of the at least one indication to at least one reference of a respective spatial segment is based on a prediction of future activity and the determination of the light intensity level for the respective at least one spatial segment is performed such that one or more spatial segments ahead of the entity are selected to increase the light intensity, and/or such that one or more spatial segments behind the entity are selected to decrease the light intensity.

If the light intensity of the outdoor lamps is dimmed to a low level, it is advantageous to increase the light intensity of a segment before the traffic approaches the segment. This increases safety and is traffic-friendly. Further, if a specific segment is behind the moving entity, there is no need any more to light the specific segment with the higher intensity, and by reducing the light emission in the specific segment energy is saved.

The direction of movement in combination with the indication of the sub-area provides information about the segments which the entity is going to pass in a time interval after receiving information from the detection system and about which segments were passed. The speed of movement determines how soon the segments ahead will be entered. The combination of information is used to determine, with respect to an advancing vehicle, the minimum distance at which the outdoor lamps should be emitting at the desired intensity level in order to prevent that the driver of the vehicle is able to see that the light intensity of the outdoor lamps suddenly increases. Also after passage of the vehicle, the lamps should remain at the same intensity level over a minimum distance with respect to the vehicle to prevent that the driver is able to see that the light intensity suddenly decreases. The distance in front of the vehicle should be longer than the distance behind the vehicle because of the difference in the field of view that a car driver has ahead of his car and behind his car.

The method of this embodiment is especially useful for outdoor lighting of outdoor spaces with little activity, for example, spaces where during relatively long periods there is no movement of entities. A lot of energy may be saved by employing the method according to the embodiment, while at the same time the drivers of the vehicles experience the light intensity level as positive.

In an embodiment, the light intensity levels are determined by applying a predefined relation to the activity property, and/or by applying a predefined set of rules to the activity property.

The use of a predefined relation and/or a set of predefined rules is an effective and efficient solution to determine the light intensity. In the case of a predefined relation and/or predefined rules one is able to codify effects that have to be obtained by the method according to the first aspect of the invention. Examples of rules are: the more activity is detected, the higher the light intensity has to be; or: the faster the traffic is moving, the higher the light intensity has to be. Such relations may be implemented with uncomplicated software or even by means of uncomplicated hardware.

In an embodiment, the activity property of the sub-area further comprises at least one of the following: a number of entities currently present in the sub-area, a number of moving entities in the sub-area, a direction of movement of an entity, an average direction of movement of a group of entities, a set of directions of movement related to a set of entities, a speed of movement of an entity, an average speed of movement of a group of entities, a set of speeds of movement related to a set of specific entities.

It is to be noted that an entity may be a person, a vehicle, and/or for example a mobile communication device.

In another embodiment, the indication of the sub-area comprises at least one of the following: a number of the sub-area, a coordinate related to the sub-area, a sub-area description in the format of a polygon defined by a list of coordinates.

If a number is used prior knowledge needs to be available with respect to the area coverage of the specific indicated sub-area. This knowledge is required for the mapping of the indication to one or more spatial segments. For example, in a table all possible numbers may be related to sub-area definitions. The coordinates are coordinates in a specific schema which are used to describe the outdoor space. Today, GPS coordinates are usually used by a detection system. When a coordinate is used, an arbitrary coordinate within the sub-area may be received, or a reference coordinate is received. For example, in a mobile communication network, the coordinate may be the estimated coordinate of a mobile communication device in a specific cell of the network, or the coordinate may be a reference coordinate which defines the centre of the specific cell. If the method is completely without prior knowledge of the sub-areas, a sub-area definition may be received which defines a polygon in the outdoor space.

According to a second aspect of the invention a computer program product is provided which comprises instructions for causing a processor system to perform the method according to the first aspect of the invention.

According to a third aspect of the invention a controlling device is provided for controlling an outdoor lighting system. The outdoor lighting system comprises outdoor lamps which are distributed over spatial segments of an outdoor space; the emitted light intensity of the outdoor lamps is controllable for each spatial segment, and references are used to refer to the respective spatial segments. The controlling device comprises an input means, a processing unit and an output means. The input means is arranged for receiving from a detection system an indication of a sub-area of the outdoor space and for receiving at least one activity property for the sub-area. The detection system is arranged for detecting activity in the sub-area. The sub-area is different from all the spatial segments, and indications are used to refer to the sub-area. The at least one activity property is related to a traffic density in the sub-area. The processing unit is arranged for mapping the at least one indication to at least one reference of a respective spatial segment and for determining a light intensity level for the respective at least one spatial segment in dependence on the received at least one activity property. The output means is arranged for providing the at least one reference together with the respective determined light intensity to the outdoor lighting system.

According to a fourth aspect of the invention an outdoor lighting system is provided which comprises outdoor lamps which are distributed over spatial segments of an outdoor space, the emitted light intensity of the outdoor lamps being controllable for each spatial segment, and references being used to refer to the respective spatial segments, and said outdoor lighting system comprising a controlling device according to the third aspect of the invention.

The computer program product according to the second aspect of the invention, the controlling device according to the third aspect of the invention, and the outdoor lighting system according to the fourth aspect of the invention provide the same benefits as the method according to the first aspect of the invention and have similar embodiments with similar effects as the corresponding embodiments of the method.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the system, the method, and/or of the computer program product, which correspond to the described modifications and variations of the system, can be carried out by a person skilled in the art on the basis of the present description.

BRIEF DESCRIPTION OF THE DRAWINGS

In the drawings:

FIG. 1 schematically shows the method according to the first aspect of the invention, FIG. 2 schematically shows a system according to the third aspect of the invention, FIG. 3 schematically shows a highway with separated lanes illuminated by a street lighting system and cells of a mobile communications network, and FIG. 4a and FIG. 4b schematically show a table which may be used for transforming an indication of a sub-area into one or more indications of one or more segments.

It should be noted that items denoted by the same reference numerals in different Figures have the same structural features and the same functions, or are the same signals. Where the function and/or structure of such an item have been explained, there is no necessity for a repeated explanation thereof in the detailed description.

The Figures are purely diagrammatic and not drawn to scale. Particularly for clarity, some dimensions are exaggerated strongly

DETAILED DESCRIPTION OF THE EMBODIMENTS

Figure 1:
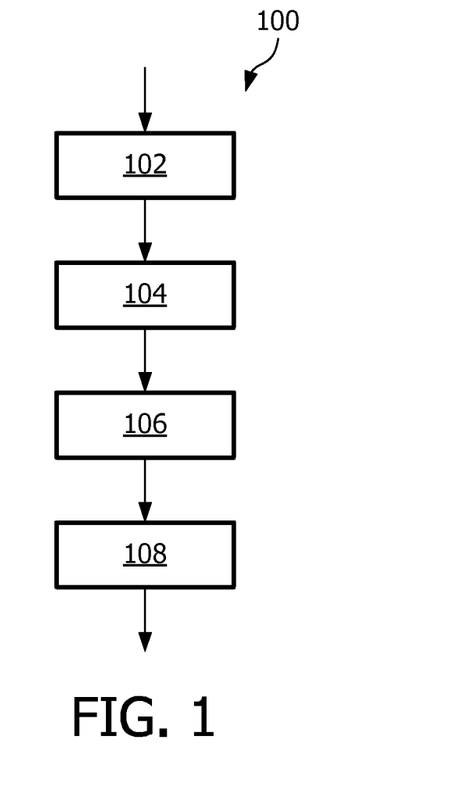

In FIG. 1 an embodiment of a method 100 according to the first aspect of the invention is shown. The method is suitable for controlling an outdoor lighting system. The outdoor lighting system comprises outdoor lamps which are distributed over spatial segments of an outdoor space. The outdoor lamps of a specific spatial segment illuminate the spatial segment with a controllable light intensity. In step 102 of the method an indication of a sub-area and an activity property for the sub-area are received from a detection system. The detection system detects activity in sub-areas of the outdoor space. At least one sub-area is different from all the spatial segments of the outdoor lighting system. In step 104 the indication of the sub-area is transformed to one or more indications of one or more spatial segments. In step 106 the light intensity level for each one of the one or more spatial segments is determined in dependence on the activity property. In step 108 the one or more indications of the one or more spatial segments are provided, together with their corresponding determined light intensity, to the outdoor lighting system.

The method 100 provides a solution for using information from detection systems which are not especially designed for controlling the outdoor lighting systems. There is a large installed base of detection systems close to roads, highways, parking lots, petrol station, etc. The detection systems are, for example, used for traffic guidance, traffic observation, collecting toll fee, safety, security, or license plate recognition. Sensors of the detection system detect activity in the sub-areas and/or the detection system may deduct activity properties from the sensor signals. For example, a sensor comprising two loops which are incorporated in the road surface detects the speed and number of passing vehicles in a specific road section between the two loops. Cameras observe, for example, a sub-area of the outdoor space to detect persons and/or vehicles. An infrared movement sensor, for example, detects changes in infrared patterns of a limited outdoor area to detect movements of persons and/or vehicles in the outdoor area.

Figure 2:
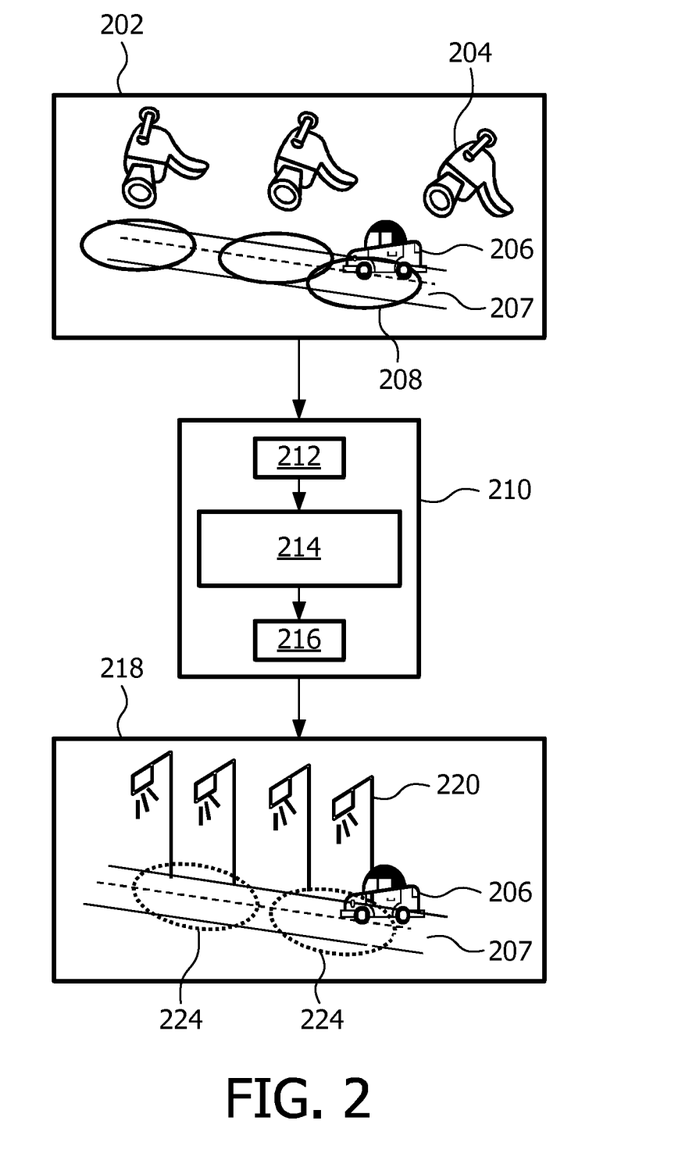

In FIG. 2 an embodiment of the controlling device 210 is shown. The controlling device 210 is connected to a detection system 202 and an outdoor lighting system 218.

The detection system 202 is, for example, a traffic observation system. The detection system 202 comprises a number of cameras 204 which are positioned along a road 207 and each one of the cameras 204 observes a sub-area 208 of the road 207. The primary function of the detection system is to enable an operator in a central operating room to detect traffic problems along the road 207. The detection system 202 is further configured for determining traffic density of each one of the sub-area 208, which is done by means of an image processing system. If, for example, the activity of a single car 206 is detected in a specific sub-area 208 by camera 204, the detection system provides the value "1" for the specific sub-area 208. Thus, the detection system is capable of providing for each one of the sub-areas 208 an activity property which, in the specific example of FIG. 2, is the traffic density of the sub-area.

The outdoor lighting system 218 is installed along the same road 207 and comprises street lamps 220 installed at positions along the road 207. The street lamps 220 are assigned to segments 224 of, for example, equal length. In the specific example of FIG. 2, each segment 224 has been assigned two street lamps 220. The intensity of the light emitted by the street lamps 220 of one segment may be controllable and, thus, the street lamps 220 of one segment emit light of the same intensity. The segments 224 are parts of the road 207 and the street lamps 220 of each segment illuminate the segment 224 of the road 207.

The controlling device 210 comprises an input means 212, a processing unit 214 and an output means 216. The input means 212 receives from the detection system 202 an activity property for one of the sub-areas 208 and an indication for the one of the sub-areas 208. The indication comprises, for example, a reference number of the sub-area 208 of which the controlling device 210 has prior knowledge. This means that the controlling device 210 knows between which two points of the road 207 the sub-area 208 stretches out. In the example of FIG. 2 the activity property is a value which represents the number of cars 206 present in the sub-area 208.

The processing unit 214 first transforms the indication of the sub-area 208 to one or more indications of segments 224 of the outdoor lighting system. This may be done, for example, by means of a standard table which comprises per row an indication of a specific sub-area 208 with its corresponding segments 224. The corresponding segments 224 may be the segments 224 that spatially overlap with the specific sub-area 208.

Subsequently, the desired light intensity for the one or more segments 224 is determined by the processing unit 214. This may be done by applying a function to the activity property of the sub-area 208, or by applying a set of rules. An example of such a set of rules is: i) if the traffic density value is larger than 0, the street lamps 220 of the segment 224 have to emit light at 40% of their maximum intensity; ii) if the density value is larger than 3, the street lamps have to emit light at 100% of their maximum intensity; iii) otherwise the street lamps do not have to emit light.

If the processing unit 212 has obtained one or more indications of one or more segments 224 and has determined the desired light intensity for each one of the segments 224, the output means 216 redirects this information to the outdoor lighting system 218. The outdoor lighting system 218 controls the light emission of the indicated segments accordingly.

The indication of the segment 224 may be a reference number which is known in the controlling device 210 as the indication of the segment 224.

Figure 3:
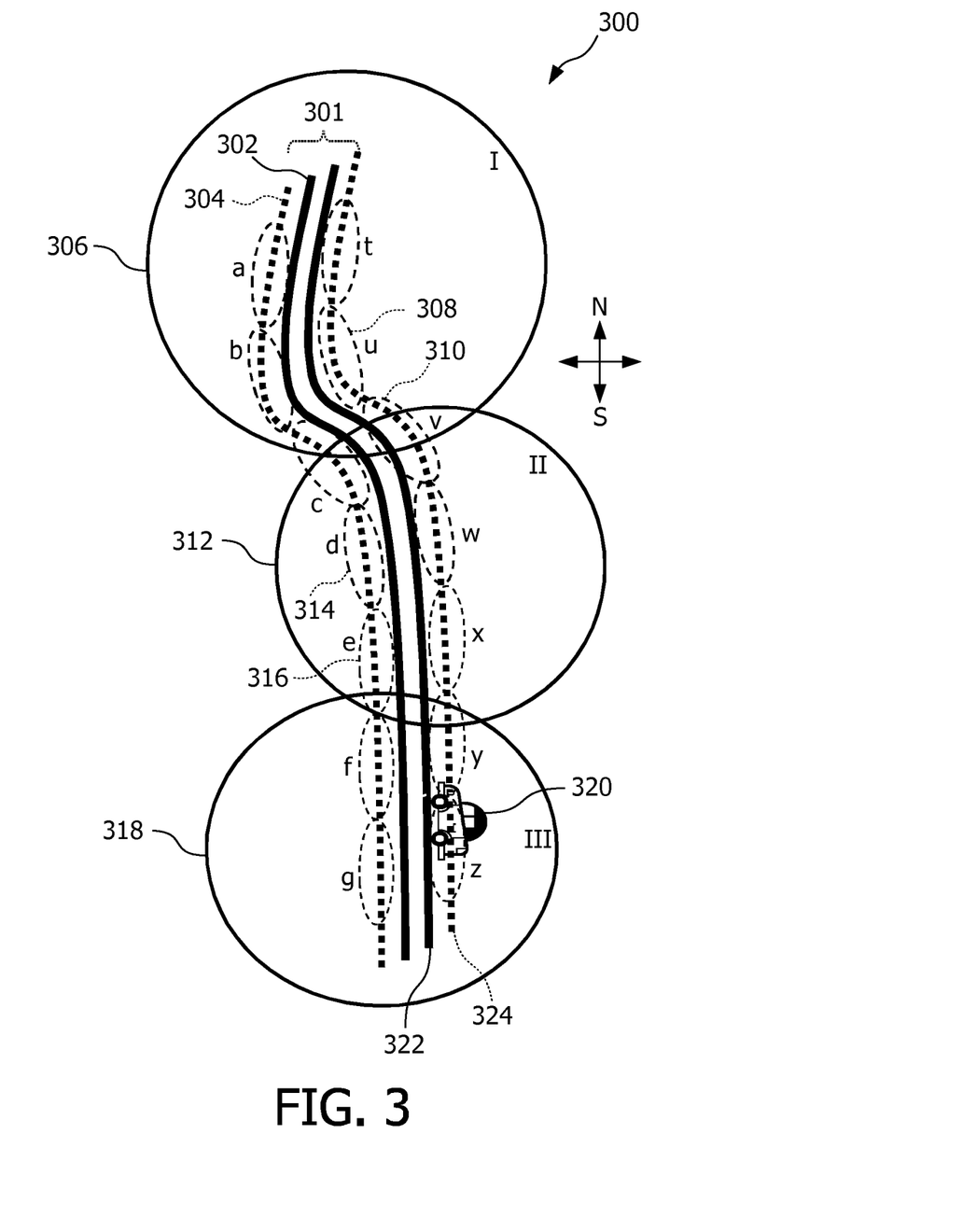

In FIG. 3 an outdoor space 300 is drawn comprising a highway 301 with separated lanes 302, 322. A substantially southward oriented lane 302 has a first chain of street lamps 304 and a substantially northwards oriented lane 322 has a second chain of street lamps 324.

The street lamps of both chains 304, 324 are distributed over segments, such as segments 308, 310, 314, 316. Each segment has an indication letter which are referenced "a" to "g" and "t" to "z" in FIG. 3. Segments a to g only illuminate parts of the southwards oriented lane 302, and segments t to z only illuminate parts of the northwards oriented lane 322. Each one of the segments, such as segments 308, 310, 314, 316, comprises a segment controller which dims the street lamps to a desired level. The segment controllers receive a signal from a central controller which indicates the desired light intensity level for the respective segment, such as segments 308, 310, 314, 316.

In the outdoor space there is further installed a mobile communication system which acts as the detection system 212 of FIG. 2 in the example of FIG. 3. Several base stations are installed along the highway such that the drivers of cars 320 on the highway may communicate via a wireless communication device to a communication network. Around the base stations a cell 306, 312, 318 is drawn which indicates the coverage of each one of the base stations. The mobile communication system is able to detect the presence of mobile communication device within each of the cells 306, 312, 318 and is also capable of estimating both direction and speed of movement of the mobile communication devices in the cells 306, 312, 318. Thus, if a driver of a car 320 carries a mobile communication device, or if, for example, the car 320 is supplied with a mobile communication device, the mobile communication system is able to detect in which one of the cells 306, 312, 318 the mobile device is moving and in which direction it is moving (an thus, in which one of the cells 306, 312, 318 a car or a person is moving). The cells 306, 312, 318 of the mobile communication network have been assigned indication values in roman numerals, namely I, II and III. These indications are known by the controlling device 210 of FIG. 2 which means that the controlling device 210 knows which part of the outdoor space 300 is covered by the indicated cell 306, 312, 318.

It is to be noted that, in general, the cells 306, 312, 318 of the mobile phone network are relatively small in cities and villages, while they have a relatively large circular shape on the country side. Further, neighboring cells 306, 312, 318 partly overlap at their borders. In the example of FIG. 3 the base stations are located close to the highway, but in other embodiments the base stations may be located farther away such that only the border of cells 306, 312, 318 overlap with the highway. In another embodiment it is possible that not the complete highway is covered by the mobile phone network, which may for example be the case if the highway goes through a tunnel which does not have a dedicated base station inside the tunnel.

The mobile communication network is, for example, equipped with a cellular floating phone data system that is disclosed in EP1348208 to determine activity properties on the basis of data available in the mobile communication network.

Figure 4A:
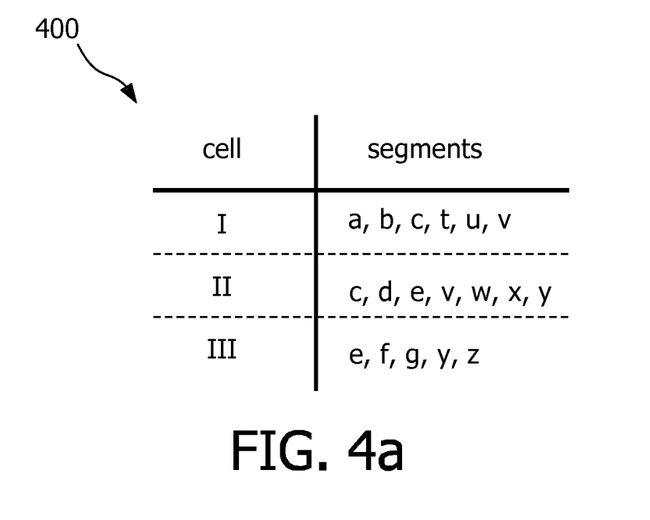

In the table of FIG. 4a a possible predefined mapping 400 between the indications of the cells of the mobile communication network and the indications of the segments 308, 310, 314, 316 of the street lighting system is presented. The predefined mapping 400 is based on spatial overlap between the segments 308, 310, 314, 316 and the cells 306, 312, 318. This table is available in the controlling device 210 of FIG. 2 and used by the controlling device 210 to transform an indication of a cell 306, 312, 318 to one or more indications of segments 308, 310, 314, 316. If, for example, at the input means 212 an indication of cell III is received, together with an activity property of "the traffic density in cell III is value x", the processing unit 214 transforms the indication of cell III into the segment indications e, f, g, y and z. Subsequently, a predefined function with input variable the value of x or a predefined set of rules is used to determine the light intensity for the segments e, f, g, y and z. The determined light intensities together with the indications e, f, g, y and z, are provided to the street lighting system via the output means 216.

In another embodiment, the input means 212 receives for individual mobile communication devices an indication of the cell 306, 312, 318 in which the individual device is present, and receives for the individual device a direction of movement property, which may be "roughly northwards" or "roughly southwards". It is to be noted that mobile communication networks are only capable of estimating the direction of movement, and, as seen in FIG. 3, the highway is not always oriented exactly northwards and exactly southwards.

Figure 4B:
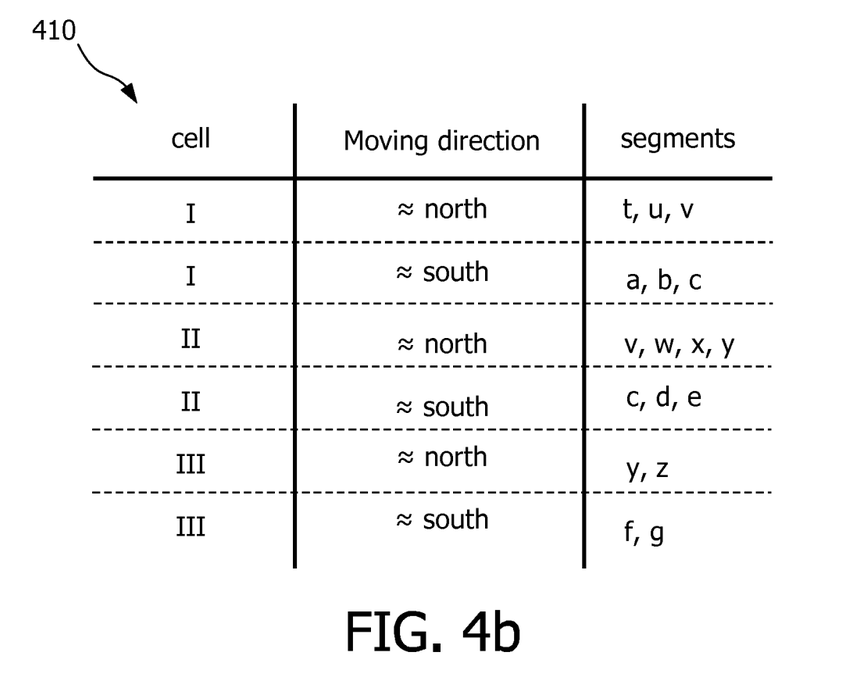

In the embodiment, the table of FIG. 4b is used to transform the received indication of the cell 306, 312, 318, while also using the activity property, to one or more indications of segments 308, 310, 314, 316. The table of FIG. 4b is another predefined mapping 410 and allows increasing the light at one lane 302, 322 of the highway 301, while at the same time the street lamps on the other side are dimmed. If, for example, a car 320 is detected in cell III and its estimated driving direction is approximately northwards, the result of applying the table of FIG. 4b in the controlling device is that segments y and z are selected for emitting light at a relatively high light intensity level, while the street lamps of segments f and g remain dimmed at a low light intensity level.

In another example, the detection system provides an activity property in combination with two indications of cells 306, 312, 318 of the mobile phone network. The activity property is that a single mobile phone is moving in a northwards direction within the cell I and II. As seen in FIG. 3, the cells I and II overlap and especially segment v of the northwards oriented chain of street lamps 324 is located where cells I and II overlap. This information is also present in the table of FIG. 4b. It is seen that the rows of the table matching with "cell I—northward direction" and matching with "cell II—northward direction" both have segment v as a mapped segment. Thus, by receiving the specific information of the example, the mapping of the two indications towards one or more references of segments may result in obtaining only the reference v.

In another embodiment, the controlling device uses a predictive algorithm to transform the indication of the sub-area into one or more indications of segments of the outdoor lighting system based on some activity properties. For example, the mobile communication network provides the activity properties speed of movement and direction of movement for a detected mobile communication device. For example, if it has been detected that a mobile communication device is for example present in cell II, and is moving substantially southwards, at a relatively high speed, not only the segments c, d, and e that overlap with cell II are selected to increase the light intensity of the street lamps of the segments, but also segments f and g are selected to increase the light intensity such that, when the driver arrives in the segments f and g, the light intensity level is already increased to a high enough level. Further, if other segments along the southwards oriented lane 302 which are located behind the detected mobile communication device emit light at a relatively high light intensity level, for example segments a and b, some of the segments far enough away from the detected mobile communication device, for example segment a, are selected to reduce the light intensity, and some of the segments which are still in the field of view of the driver of the car, for example segment b, are selected to remain at the relatively high light intensity level. Such a predictive algorithm provides the driver of a car, which carries the detected mobile communication device, with a good user experience with respect to the street lighting. When the driver arrives in a specific segment, the street lamps of the segments emit light already at a high enough intensity level, and one or more segments behind the car also still emit light. Thus, the driver of the car does not see that the lamps ahead of the car switch on and that the lamps behind the car are dimmed to a lower level. It is to be noted that the field of vision of a car driver is larger ahead of the car than behind the car, thus, more segments ahead of the car have to be selected to increase the light than the number of segments behind the car that still have to emit light although the car has passed the segments.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Method of controlling an outdoor lighting system, the outdoor lighting system comprising outdoor lamps which are distributed over spatial segments of an outdoor space, the emitted light intensity of the outdoor lamps being controllable for each spatial segment, and references being used to refer to specific spatial segments, the method comprising the steps of:

receiving from a detection system an indication of a sub-area of the outdoor space and receiving at least one activity property for the sub-area, the detection system being arranged for detecting activity in the sub-area, the sub-area being different from all the spatial segments, the indication being used to refer to the sub-area, and the at least one activity property being related to a traffic density in the sub-area, mapping the at least one indication to at least one reference of a respective spatial segment, wherein the mapping is performed on the basis of a predefined mapping between the sub-areas and the spatial segments, determining a light intensity level for the respective at least one spatial segment in dependence on the received at least one activity property, and providing the at least one reference together with the respective determined light intensity to the outdoor lighting system.

2. Method according to claim 1, wherein the detection system being arranged for detecting activities in a plurality of sub-areas comprising the sub-area.

3. Method according to claim 1, wherein the detection system is at least one of the following types: systems for the detection of electronic devices, sound detection systems, observing systems or traffic detection systems.

4. Method according to claim 1, wherein the detection system is a mobile communication network.

5. Method according to claim 4, wherein the received at least one activity property relates to at least one mobile communication device.

6. Method according to claim 5, wherein the at least one activity property:
relates to a plurality of moving mobile communication devices, and/or
comprises information about a direction of movement of the at least one mobile communication device.

7. Method according to claim 4, wherein a cell of the mobile communication network corresponds to the sub-area.

8. Method according to claim 1, wherein the predefined mapping is based on aerial overlap between the sub-areas and the spatial segments.

9. Method of controlling an outdoor lighting system, the outdoor lighting system comprising outdoor lamps which are distributed over spatial segments of an outdoor space, the emitted light intensity of the outdoor lamps being controllable for each spatial segment, and references being used to refer to specific spatial segments, the method comprising the steps of:
receiving from a detection system an indication of a sub-area of the outdoor space and receiving at least one activity property for the sub-area, the detection system being arranged for detecting activity in the sub-area, the sub-area being different from all the spatial segments, the indication being used to refer to the sub-area, and the at least one activity property being related to a traffic density in the sub-area,
mapping the at least one indication to at least one reference of a respective spatial segment,
determining a light intensity level for the respective at least one spatial segment in dependence on the received at least one activity property, wherein the determining of the light intensity levels is performed by applying a predefined relation to the activity property, and/or by applying a predefined set of rules to the activity property, and
providing the at least one reference together with the respective determined light intensity to the outdoor lighting system.

10. Method of controlling an outdoor lighting system, the outdoor lighting system comprising outdoor lamps which are distributed over spatial segments of an outdoor space, the emitted light intensity of the outdoor lamps being controllable for each spatial segment, and references being used to refer to specific spatial segments, the method comprising the steps of:
receiving from a detection system an indication of a sub-area of the outdoor space and receiving at least one activity property for the sub-area, the detection system being arranged for detecting activity in the sub-area, the sub-area being different from all the spatial segments, the indication being used to refer to the sub-area, and the at least one activity property being related to a traffic density in the sub-area,
mapping the at least one indication to at least one reference of a respective spatial segment,
determining a light intensity level for the respective at least one spatial segment in dependence on the received at least one activity property, and
providing the at least one reference together with the respective determined light intensity to the outdoor lighting system,
wherein the at least one activity property of the respective at least one sub-area further comprises at least one of the following: a number of entities currently present in the sub-area, a number of moving entities in the sub-area, a direction of movement of an entity, an average direction of movement of a group of entities, a set of directions of movement related to a set of entities, a speed of movement of an entity, an average speed of movement of a group of entities, a set of speeds of movement related to a set of specific entities.

11. Method according to claim 1, wherein the indication of the sub-area comprises at least one of the following: a number of the sub-area, a coordinate related to the sub-area, a sub-area description in the format of a polygon defined by a list of coordinates.

12. Method according to claim 1, wherein the determining of the light intensity levels is performed by applying a predefined relation to the activity property, and/or by applying a predefined set of rules to the activity property.

13. Method according to claim 1, wherein the at least one activity property of the respective at least one sub-area further comprises at least one of the following: a number of entities currently present in the sub-area, a number of moving entities in the sub-area, a direction of movement of an entity, an average direction of movement of a group of entities, a set of directions of movement related to a set of entities, a speed of movement of an entity, an average speed of movement of a group of entities, a set of speeds of movement related to a set of specific entities.

14. Method according to claim 9, wherein the detection system being arranged for detecting activities in a plurality of sub-areas comprising the sub-area.

15. Method according to claim 9, wherein the detection system is at least one of the following types: systems for the detection of electronic devices, sound detection systems, observing systems or traffic detection systems.

16. Method according to claim 9, wherein the detection system is a mobile communication network.

17. Method according to claim 10, wherein the detection system being arranged for detecting activities in a plurality of sub-areas comprising the sub-area.

18. Method according to claim 10, wherein the detection system is at least one of the following types: systems for the detection of electronic devices, sound detection systems, observing systems or traffic detection systems.

19. Method according to claim 10, wherein the detection system is a mobile communication network.

* * * * *